United States Patent
Ishikawa et al.

(10) Patent No.: US 9,348,331 B2
(45) Date of Patent: May 24, 2016

(54) ROBOT APPARATUS AND SPEED REDUCER STATE DIAGNOSING METHOD

(71) Applicant: CANON KABUSHIKI KAISHA, Tokyo (JP)

(72) Inventors: Takahiro Ishikawa, Kawasaki (JP); Tsutomu Osaka, Yokohama (JP); Kazunori Ogami, Moriya (JP); Shunsuke Kawamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/303,138

(22) Filed: Jun. 12, 2014

(65) Prior Publication Data

US 2014/0379128 A1 Dec. 25, 2014

(30) Foreign Application Priority Data

Jun. 20, 2013 (JP) .................. 2013-129409

(51) Int. Cl.
*G05B 19/406* (2006.01)
*B25J 9/16* (2006.01)

(52) U.S. Cl.
CPC .............. *G05B 19/406* (2013.01); *B25J 9/1674* (2013.01); *G05B 2219/37297* (2013.01); *G05B 2219/41359* (2013.01); *Y10S 901/09* (2013.01)

(58) Field of Classification Search
CPC .............. G05B 19/406; G05B 19/404; G05B 2219/37297; G05B 2219/41539; B25J 9/1674; B25J 9/1692; B25J 9/102; B25J 9/1602; B25J 9/1641; Y10T 74/20317; Y10T 74/20305; Y10S 901/09
See application file for complete search history.

(56) References Cited

U.S. PATENT DOCUMENTS

| 6,652,320 | B2 | 11/2003 | Inagawa et al. |
| 7,486,403 | B2 | 2/2009 | Osaka et al. |
| 2010/0101346 | A1* | 4/2010 | Johnson et al. .................. 74/405 |
| 2012/0215353 | A1* | 8/2012 | Izumi et al. .................... 700/254 |
| 2014/0084840 | A1 | 3/2014 | Osaka |

FOREIGN PATENT DOCUMENTS

| JP | 2007-301680 A | 11/2007 |
| JP | 2010-228028 A | 10/2010 |

* cited by examiner

*Primary Examiner* — Khoi Tran
*Assistant Examiner* — Abby Lin
(74) *Attorney, Agent, or Firm* — Fitzpatrick, Cella, Harper & Scinto

(57) ABSTRACT

A robot apparatus includes a multi-joint robot including, in at least one portion, a joint including a motor, a speed reducer connected to the motor, an input angle detecting unit configured to detect a rotational angle of a rotating shaft of the motor, and an output angle detecting unit configured to detect an output rotational angle of the speed reducer, and a controller configured to diagnose a state of the speed reducer from an angle difference between the input rotational angle detected by the input angle detecting unit and the output rotational angle detected by the output angle detecting unit.

10 Claims, 14 Drawing Sheets

ROBOT APPARATUS AND SPEED REDUCER STATE DIAGNOSING METHOD

BACKGROUND OF THE INVENTION

1. Field of the Invention

The present invention relates to a robot apparatus capable of diagnosing the state of a speed reducer formed in each joint of a multi-joint robot, and a multi-joint robot speed reducer state diagnosing method.

2. Description of the Related Art

Conventionally, various robot apparatuses have been used in factories and the like, and robot apparatuses including multi-axis, multi-joint robotic arms in order to perform more complicated operations have widely spread in recent years.

In a robot apparatus for performing a complicated operation as described above, the degree of freedom of the operation of a robotic arm is high. During the operation, therefore, the robotic arm may be damaged by contacting another object such as a surrounding structure, work, or tool. For example, if the robotic arm collides against, e.g., a surrounding object and a shock is applied to a speed reducer of an actuator formed in a joint, the speed reducer may cause damage such as ratcheting. If the speed reducer is damaged, the angle transfer accuracy of the joint decreases, and this decreases the operation accuracy of the robotic arm. Recently, therefore, various techniques have been proposed against the collision of the robotic arm.

For example, a technique in which an angle detector is installed on each of the input side and output side of an actuator (a motor and speed reducer) of each joint of the robotic arm, whether a collision has occurred is determined from a detected angle difference, and the robotic arm is driven in the opposite direction if it is determined that a collision has occurred has been proposed (see Japanese Patent Application Laid-Open No. 2010-228028).

The technique described in Japanese Patent Application Laid-Open No. 2010-228028 can detect the occurrence of contact of the robotic arm. Since, however, a speed reducer is difficult to visually check from the outside, it is impossible to know the degree of damage inflicted to a speed reducer by contact. To determine damage to a speed reducer, therefore, it is necessary to check the tooth surface of a gear by disassembling the speed reducer, and determine the necessity of replacement. To determine damage to a speed reducer by disassembling, however, the speed reducer must be removed from the robotic arm and disassembled, and this requires a long time.

On the other hand, a technique in which a driving torque obtained from the value of a driving current to an actuator of each joint and an estimated torque obtained from a command position and torque fluctuation parameter are compared and the necessity of replacement is determined based on the torque difference has been proposed (see Japanese Patent Application Laid-Open No. 2007-301680).

Unfortunately, the technique described in Japanese Patent Application Laid-Open No. 2007-301680 lacks accuracy because a torque value to be used in abnormality detection is obtained by estimation by calculations from various parameters (e.g., a servo gain, the weight and barycenter of the robotic arm, and a parameter having influence on the driving torque of a servo motor).

Accordingly, the present invention provides a robot apparatus and multi-joint robot speed reducer state diagnosing method capable of accurately determining the state of a speed reducer of a multi-joint robot within a short time.

SUMMARY OF THE INVENTION

According to an aspect of the present invention, there is provided a robot apparatus comprising a multi-joint robot including, in at least one portion, a joint including a motor, a speed reducer connected, to the motor, input angle detecting means configured to detect a rotational, angle of a rotating shaft of the motor, and output angle detecting means configured to detect an output rotational, angle of the speed reducer, and a controller configured to diagnose a state of the speed reducer from an angle difference between the input rotational angle detected, by the input angle detecting means and the output rotational angle detected by the output angle detecting means.

According to another aspect of the present invention, there is provided a speed reducer state diagnosing method of diagnosing a state of a speed reducer of a multi-joint robot including, in at least one portion, a joint including a motor, the speed reducer connected to the motor, input angle detecting means configured to detect a rotational angle of a rotating shaft of the motor, and output angle detecting means configured to detect an output rotational angle of the speed reducer, the method comprising an input rotational angle acquiring step of acquiring an input rotational angle detected by the input angle detecting means, an output rotational angle acquiring step of acquiring an output rotational angle detected by the output angle detecting means, and a speed reducer state diagnosing step of diagnosing the state of the speed reducer from an angle difference between the input rotational angle acquired in the input rotational angle acquiring step and the output rotational angle acquired in the output rotational angle acquiring step.

Further features of the present invention, will become apparent from the following description of exemplary embodiments with reference to the attached drawings.

DESCRIPTION OF THE EMBODIMENTS

Preferred embodiments of the present invention will now be described in detail in accordance with the accompanying drawings.

A robot apparatus according to an embodiment of the present invention will be explained below with reference to FIGS. 1 to 14. The robot apparatus according to the embodiment of the present invention is an industrial robot for performing, e.g., an assembly work, and has a function for detecting and preventing a failure of a speed reducer of a multi-joint robot (a function capable of diagnosing a state). Note that a "failure" herein mentioned includes a state in which a speed reducer cannot normally be used (a normal use disabled state), in addition to a speed reducer unusable state. The normal use disabled state is, e.g., a state in which a permissible range (normal use enabled state) for predetermined use conditions is exceeded. The robot apparatus according to the embodiment of the present invention will be explained in detail below by using the first to fourth embodiments.

First Embodiment

Figure 1:
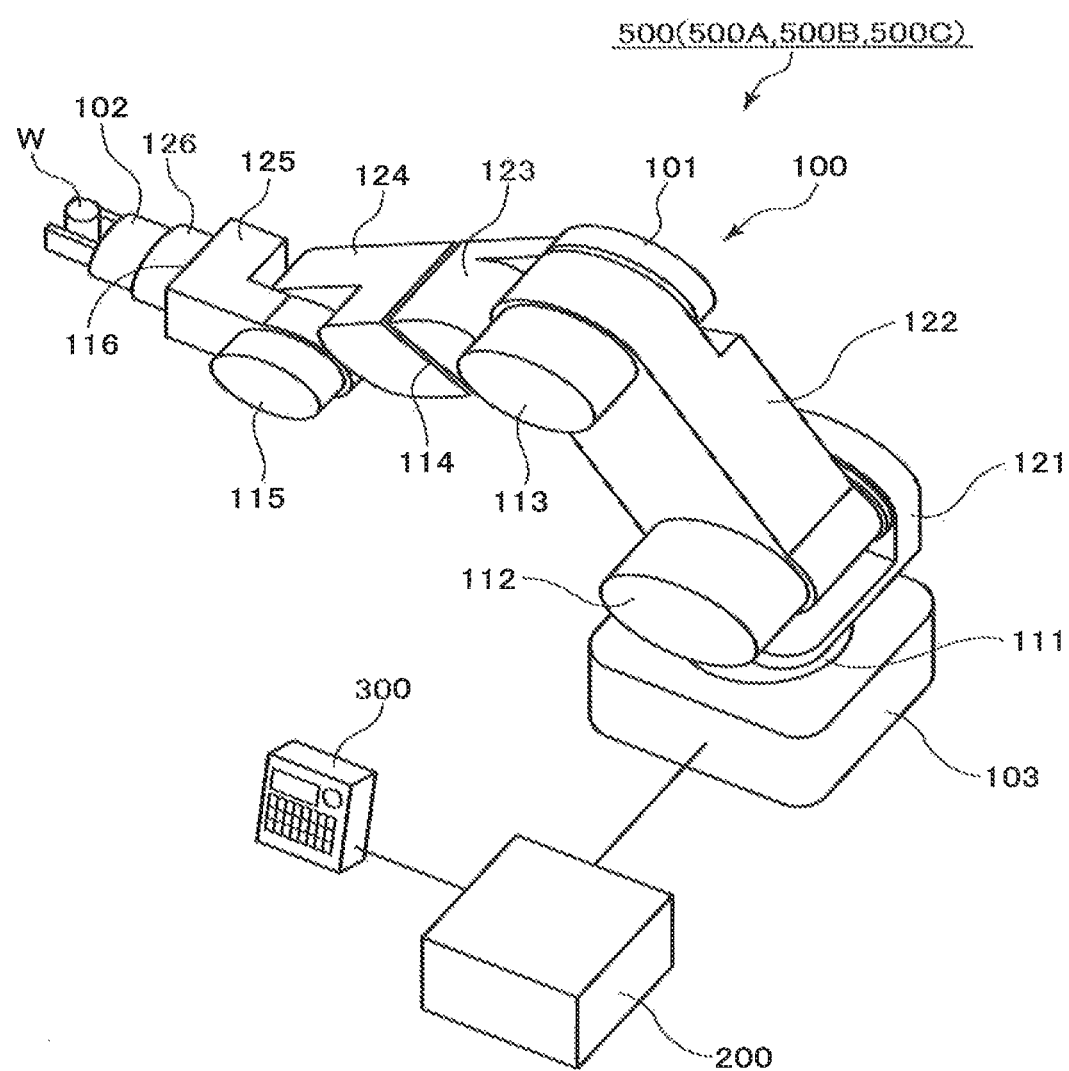
FIG. 1 is a perspective view schematically showing a robot apparatus according to the first embodiment of the present invention.
Figure 2:
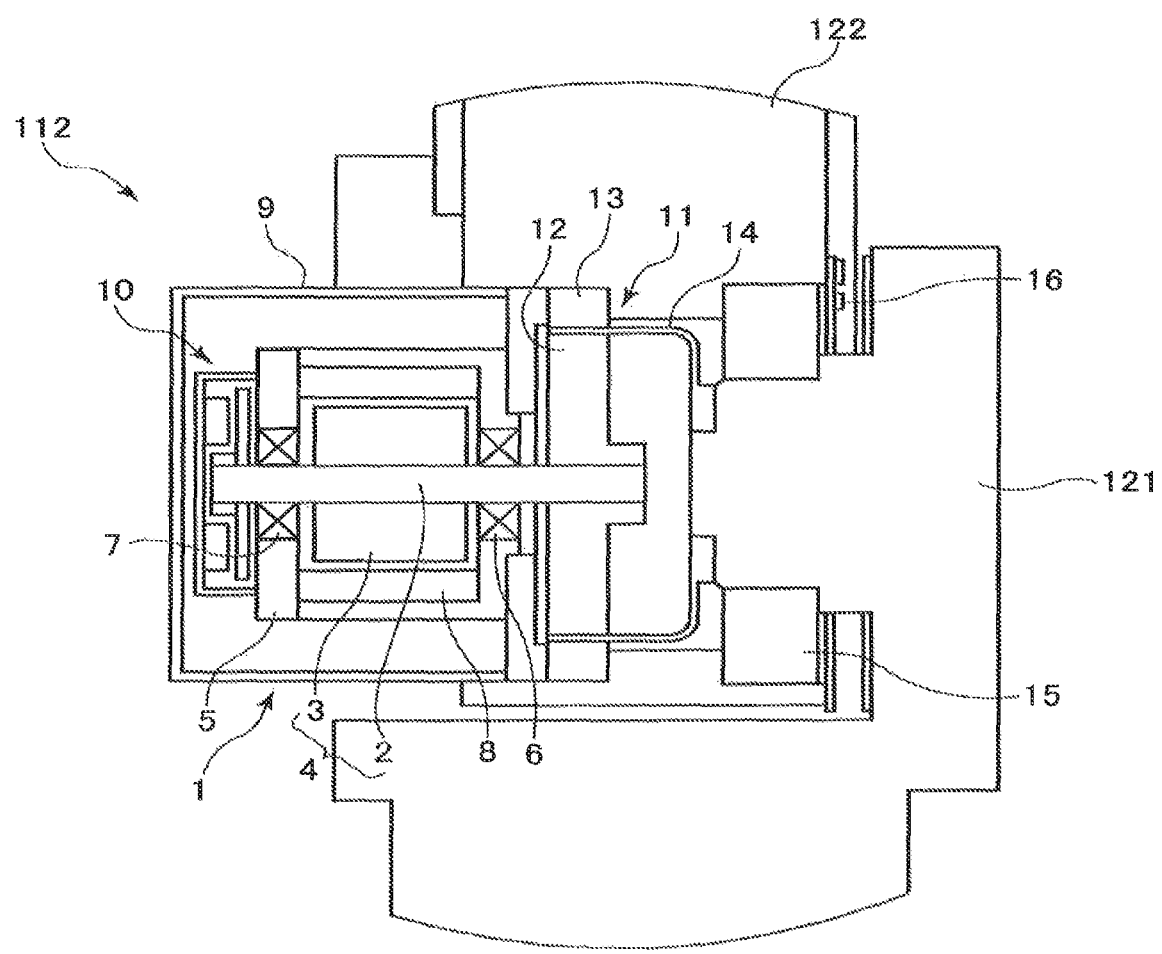
FIG. 2 is a sectional view showing a joint and its vicinity of a multi-joint robot shown in FIG. 1.
Figure 3:
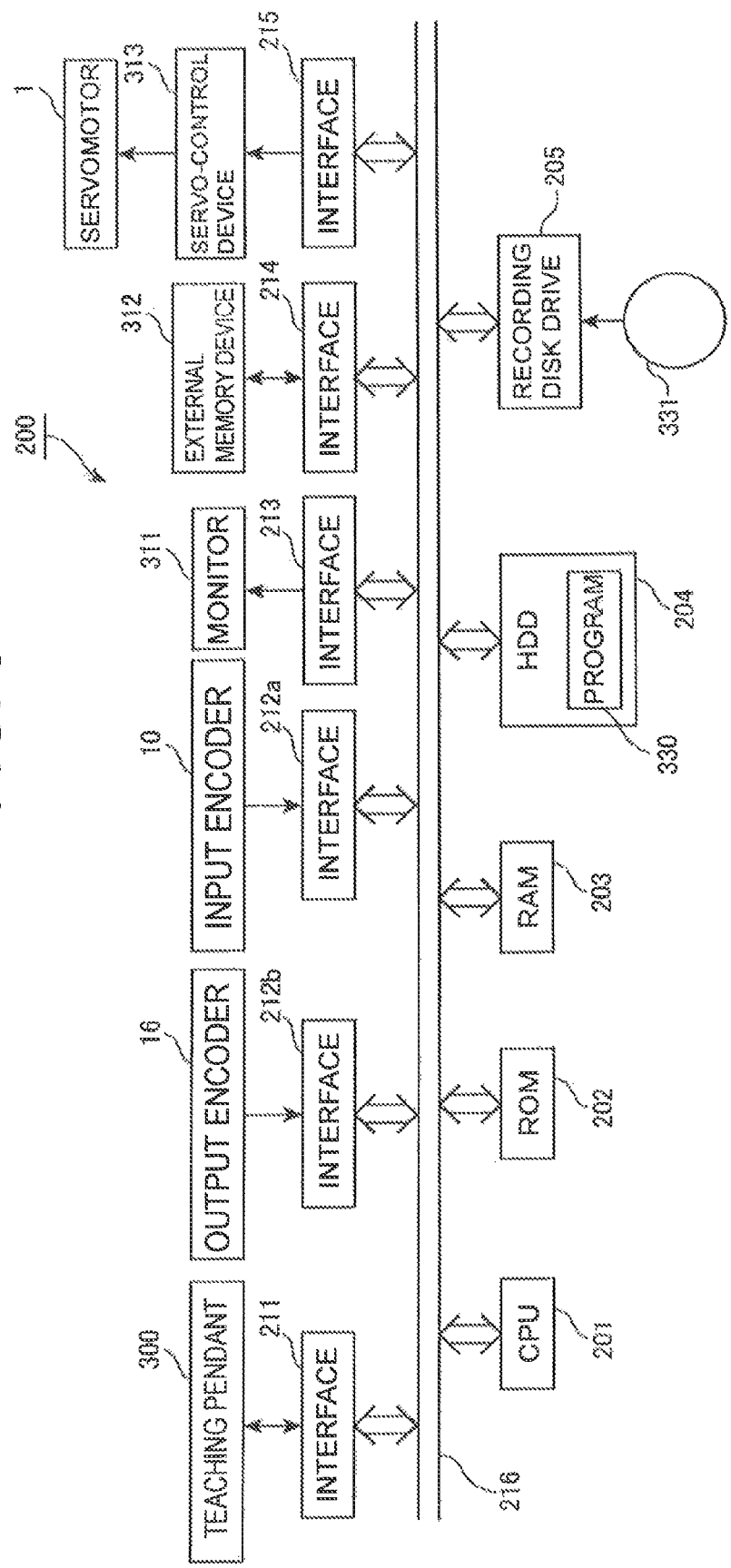
FIG. 3 is a block diagram showing the arrangement of a controller of the robot apparatus according to the first embodiment.

A robot apparatus 500 according to the first embodiment of the present invention will be explained with reference to FIGS. 1 to 7. First, the overall arrangement of the robot apparatus 500 according to the first embodiment will be explained with reference to FIGS. 1 to 3. FIG. 1 is a perspective view schematically showing the robot apparatus 500 according to the first embodiment of the present invention. FIG. 2 is a sectional view showing a joint and its vicinity of a multi-joint robot 100 shown in FIG. 1. FIG. 3 is a block diagram showing the arrangement of a controller 200 of the robot apparatus 500 according to this embodiment.

As shown in FIG. 1, the robot apparatus 500 includes the multi-joint robot 100 for assembling a work W, the controller 200 for controlling the multi-joint robot 100, and a teaching pendant 300 connected to the controller 200.

The multi-joint robot 100 includes a six-axis, multi-joint robotic arm 101, a hand (end effector) 102 connected to the distal end of the robotic arm 101, and a force sensor (not shown) capable of detecting, e.g., a force acting on the hand 102.

The robotic arm 101 includes a base portion 103 fixed to a work table, a plurality of links 121 to 126 for transmitting a displacement and force, and a plurality of joints 111 to 116 for connecting the links 121 to 126 such that they can pivot or rotate. Note that in this embodiment, the plurality of joints 111 to 116 have the same arrangement, so the joint 112 formed between the links 121 and 122 will be explained, and an explanation of the joints 111 and 113 to 116 will be omitted. Note also that at least one of the plurality of joints 111 to 116 of the robotic arm 101 need only be a joint, having the same arrangement as that of the joint 112.

As shown in FIG. 2, the joint 112 includes a servo motor (motor) 1, an input encoder 10 for detecting the rotational angle (input rotational angle) of the servo motor 1, and a wave gearing speed reducer (speed reducer) 11 for reducing the output from the servo motor 1. The joint 112 also includes an output encoder 16 for detecting the rotational angle (output rotational angle) on the output side of the wave gearing speed reducer 11.

The servo motor 1 is an electromagnetic motor, and examples are a brushless DC motor and AC servo motor. The servo motor 1 includes a rotary portion 4 including a rotating shaft 2 and rotor magnet 3, a motor housing 5, bearings 6 and 7 for rotatably supporting the rotating shaft 2, and a stator coil 8 for rotating the rotary portion 4. The bearings 6 and 7 are formed in the motor housing 5, and the stator coil 8 is attached to the motor housing 5. Also, the servo motor 1 is surrounded by a motor cover 9.

The input encoder (input angle detecting means) 10 is formed at one end of the rotating shaft 2 of the servo motor 1. The input encoder 10 generates an input pulse signal as the rotating shaft 2 of the servo motor 1 rotates, and outputs the generated input pulse signal to the controller 200. Note that a brake unit for, e.g., holding the posture of the robotic arm 101 when the power supply is turned off may also be formed between the servo motor 1 and input encoder 10 as needed.

The wave gearing speed reducer 11 includes a web generator 12 as an input portion, a circular spline 13 as an output portion, and a flex spline 14 arranged between the web generator 12 and circular spline 13. The web generator 12 is connected to the other end of the rotating shaft 2 of the servo motor 1. The circular spline 13 is connected to the link 122. The flex spline 14 is connected to the link 121. That is, the connecting portion between the rotating shaft 2 of the servo motor 1 and the web generator 12 is the input side of the wave gearing speed reducer 11, and the connecting portion between the flex spline 14 and link 121 is the output side of the wave gearing speed reducer 11. The speed of the rotating shaft 2 of the servo motor 1 is reduced to 1/N (reduced at a reduction ratio N) via the wave gearing speed reducer 11, and the links 121 and 122 relatively rotate. The rotational angle on the output side of the wave gearing speed reducer 11 in this state is the real output angle, i.e., the angle of the joint 112.

The output encoder (output angle detecting means) 16 is formed on the output side of the wave gearing speed reducer 11, and detects the relative angle between the links 121 and 122. More specifically, the output encoder 16 generates an output pulse signal in accordance with the driving of the joint 112 (the relative movement between the links 121 and 122), and outputs the generated output pulse signal to the controller 200. Note that each of the input encoder 10 and output encoder 16 is formed as an optical or magnetic rotary encoder similar to a general rotary encoder. Note also that a crossed roller bearing 15 is formed between the links 121 and 122, and the links 121 and 122 are rotatably connected via the crossed roller bearing 15.

The hand 102 includes a plurality of fingers capable of gripping the work W, and an actuator (not shown) for driving the plurality of fingers. The hand 102 is so configured as to be able to grip a work by driving the plurality of fingers. The force sensor senses a force or moment acting on the hand 102 when, e.g., the hand 102 grips the work W by the plurality of fingers.

As shown in FIG. 3, the controller 200 includes a CPU (Central Processing Unit) 201, a ROM 202, a RAM 203, an HDD (storing portion) 204, a recording disk drive 205, and various interfaces 211 to 215.

The CPU 201 is connected to the ROM 202, RAM 203, HDD 204, recording disk drive 205, and various interfaces 211 and 215 via a bus 216. A basic program such as a BIOS is stored in the ROM 202. The RAM 203 is a memory device for temporality storing the results of arithmetic processing of the CPU 201.

The HDD 204 is a storing portion for storing, e.g., various kinds of data as the results of arithmetic processing of the CPU 201, and also records a program (e.g., a speed reducer state diagnosing program (to be described later)) 330 for causing the CPU 201 to execute various kinds of arithmetic processing. The CPU 201 executes the various kinds of arithmetic processing based on the program 330 recorded (stored) in the HDD 204. The recording disk drive 205 can read out, e.g., various kinds of data and programs recorded on a recording disk 331.

The teaching pendant 300 which can be operated by the user is connected to the interface 211, and outputs the input target joint angles of the joints 111 to 116 to the CPU 201 via the interface 211 and bus 216. Also, the input encoder 10 and output encoder 16 are connected to the interfaces 212a and 212b, and output the above-described pulse signals to the CPU 201 via the interfaces 212a and 212b and bus 216. Furthermore, a monitor 311 for displaying various images and an external memory device 312 such as a programmable nonvolatile memory or external HDD are connected to the interfaces 213 and 214.

A servo-control device 313 is connected to the interface 215. The CPU 201 outputs data of a driving command indicating the control amount of the rotational angle of the rotating shaft 2 of the servo motor 1 to the servo-control device 313 via the bus 216 and interface 215 at a predetermined interval. Based on the driving command input from the CPU 201, the servo-control device 313 calculates the output amount of an electric current to the servo motor 1, and supplies the electric current to the servo motor 1, thereby controlling the joint angle of each of the joints 111 to 116 of the robotic arm 101. That is, the CPU 201 controls the driving of the joints 111 to 116 by the servo motors 1 via the servo-control device 313, so that the angles of the joints 111 to 116 become the target joint angles.

Figure 4:
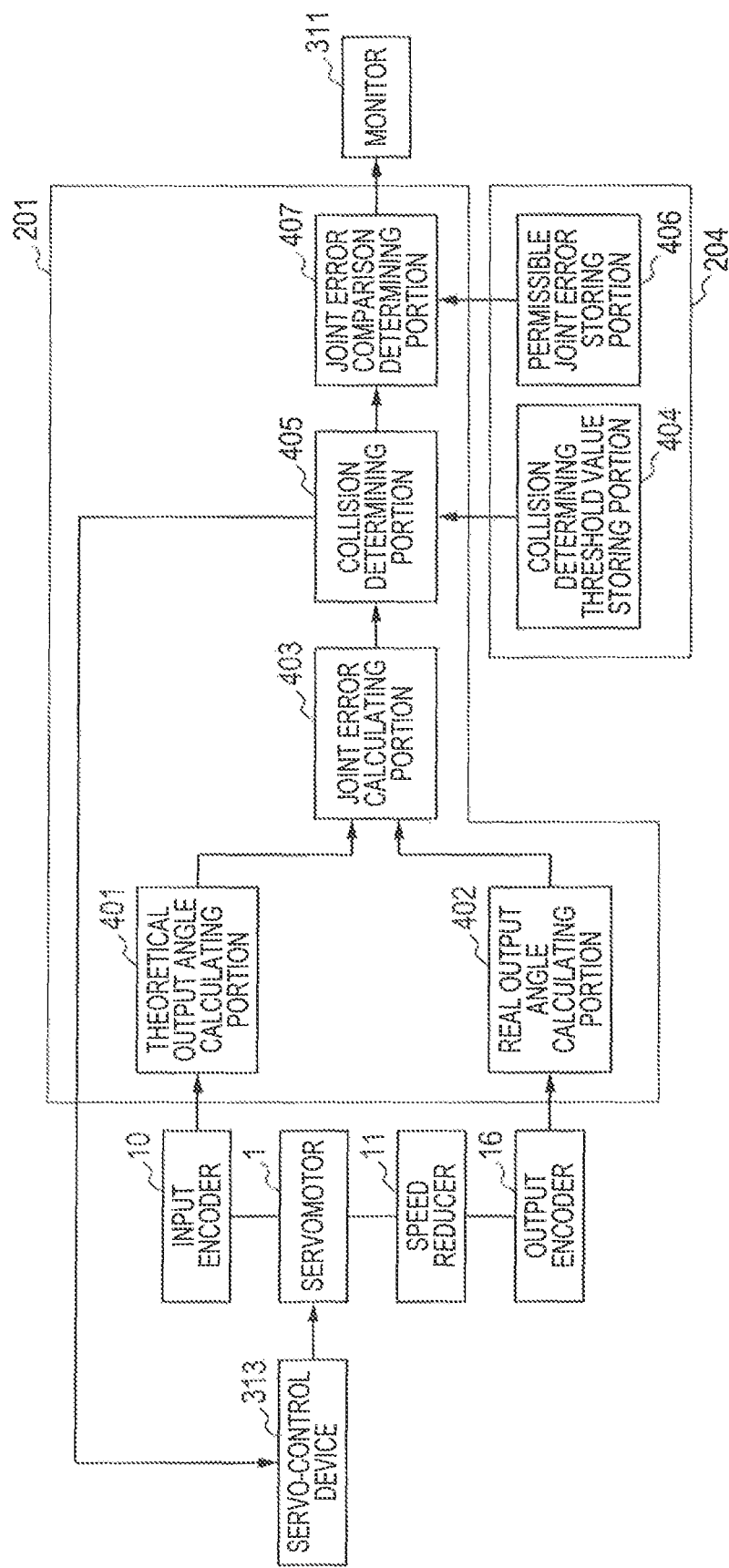
FIG. 4 is a functional block diagram, showing the control system of the robot apparatus according to the first embodiment.

The functions of the CPU 201 and HDD 204 when executing a speed reducer state diagnosing program (to be described later) will be explained below with reference to FIG. 4. FIG. 4 is a functional block diagram showing the control system of the robot apparatus 500 according to the first embodiment.

As shown in FIG. 4, the CPU 201 includes a theoretical output angle calculating portion 401, real output angle calculating portion 402, joint error calculating portion 403, collision determining portion 405, and joint error comparison determining portion 407. The HDD 204 includes a collision determining threshold value storing portion 404 and permissible joint error storing portion 406.

The theoretical output angle calculating portion 401 obtains an input rotational angle $\theta_m$ by counting the input pulse signals received from the input encoder 10, and calculates a theoretical output angle $\theta_1$ as the angle on the output side from the reduction ratio N. That is, the theoretical output angle calculating portion 401 calculates $\theta_1 = \theta_m \div N$. The real output angle calculating portion 402 calculates a real output angle (output rotational angle) $\theta_2$ by counting the output pulse signals received from the output encoder 16.

The joint error calculating portion 403 obtains an input-output joint error $\Delta\theta$ of the joint 112 from the calculation result of the theoretical output angle calculating portion 401 and the calculation result of the real output angle calculating portion 402. That is, $\Delta\theta = \theta_2 - \theta_1$. The reason why a joint error occurs is that the resilient torsion deformation (angle difference) of the wave gearing speed reducer 11 is dominant. Therefore, the joint error $\Delta\theta$ of the joint 112 can be regarded as being equivalent to the torsion amount of the wave gearing speed reducer 11.

The collision determining threshold value storing portion 404 is formed as a collisional joint error storing means, and stores a collision determining value $\theta_c$ of the wave gearing speed reducer 11. As the collision determining value $\theta_c$, a joint error which the wave gearing speed reducer 11 presumably generates when the robotic arm 101 collides is set. Note that a joint error in a normal operation may also be prestored as the collision determining value $\theta_c$, and the collision determining value $\theta_c$ is time-series data. The collision determining value $\theta_c$ may also be a value to which a predetermined margin is added.

The collision determining portion 405 detects the collision of the wave gearing speed reducer 11. The collision determining portion 405 compares the collision determining value $\theta_c$ saved in the collision determining threshold value storing portion 404 with the joint error $\Delta\theta$ calculated by the joint error calculating portion 403, thereby detecting whether a joint error corresponding to a collision has occurred. The collision determining portion 405 detects a collision if $\Delta\theta$ exceeds $\theta_c$. Note that in this embodiment, the collision determining portion 405 and collision determining threshold value storing portion 404 detect a collision. However, collision, detection may also be performed by another method such as a method using the driving current of the motor, and the user may perform collision determination.

The permissible joint error storing portion 406 stores a permissible joint error $\theta_{lim}$ of the wave gearing speed reducer 11. The permissible joint error $\theta_{lim}$ is a joint error indicating the use range of the wave gearing speed reducer 11. The robotic arm 101 is operated such that a joint error is always equal to or smaller than the permissible joint error $\theta_{lim}$. The permissible joint error $\theta_{lim}$ may be calculated from a permissible torque predetermined in a catalog or the like, and may also be a value specially obtained by an experiment. For example, according to the catalog of HARMONIC DRIVE SYSTEMS as the manufacturer of the wave gearing speed reducer, a start-stop permissible peak torque described in the catalog can be used as the permissible joint error $\theta_{lim}$.

The joint error comparison determining portion 407 compares the joint error $\Delta\theta$ obtained by the joint error calculating portion 403 with the permissible joint error $\theta_{lim}$ of the wave gearing speed reducer 11, which is stored in the permissible joint error storing portion 406, thereby determining whether the joint error $\Delta\theta$ exceeds the permissible joint error $\theta_{lim}$. If the joint error $\Delta\theta$ is larger than the permissible joint error $\theta_{lim}$, it is possible to determine that the wave gearing speed reducer 11 is damaged. On the other hand, if the joint error is equal to or smaller than the permissible joint error, it is possible to determine that normal use is possible. If determining that the wave gearing speed reducer 11 is damaged, the joint error comparison determining portion 407 displays, on the monitor 311, an alert indicating that the joint error $\Delta\theta$ has exceeded the permissible joint error $\theta_{lim}$. Note that when displaying she alert, it is also possible to simultaneously display she joint error $\Delta\theta$ or a joint torque calculated from the joint error $\Delta\theta$.

Figure 5:
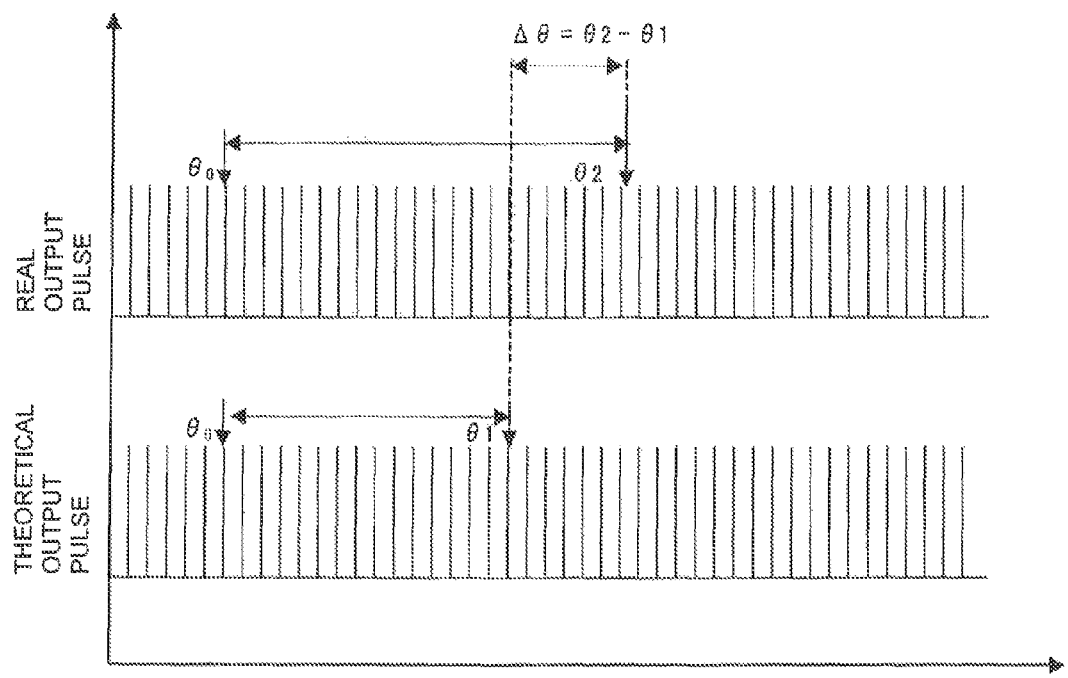
FIG. 5 is a waveform chart showing pulse signals of a joint in a normal use state.
Figure 6:
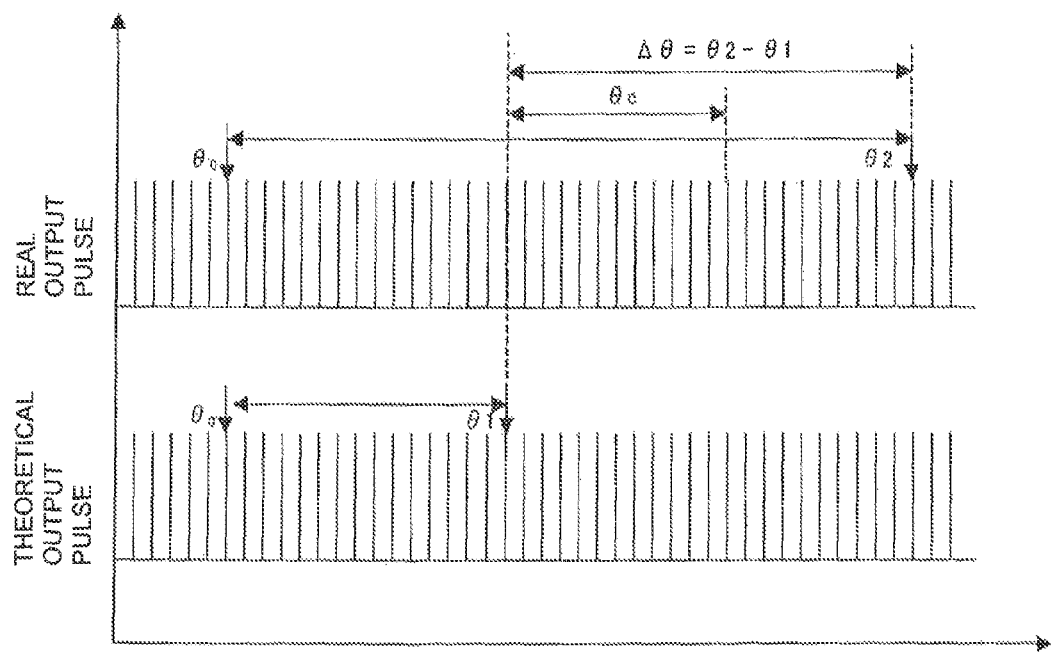
FIG. 6 is a waveform chart showing pulse signals in a state in which torsion occurs in the joint.

Next, a joint torsion angle detecting method performed by the CPU 201 will be explained with reference to FIGS. 5 and 6. FIG. 5 is a waveform chart showing pulse signals of a joint in a normal use state. FIG. 6 is a waveform chart showing pulse signals in a state in which torsion has occurred in the joint. Note that $\theta_0$ shown in FIGS. 5 and 6 indicates the origin of the joint torsion angle. Note also that the explanation will be made by assuming that, the resolution of the output, encoder 16 is equal to a resolution obtained by dividing that of the input encoder 10 by the reduction ratio.

Referring to FIGS. 5 and 6, the real output angle calculating portion 402 calculates an output pulse from the output pulse signal which is input from the output encoder 16. The theoretical output angle calculating portion 401 calculates an input pulse from the input pulse signal which is input from the input encoder 10. The joint error calculating portion 403 obtains the joint error $\Delta\theta$ by calculating the theoretical output angle $\theta_1$ and real output angle $\theta_2$.

Even in the normal use state as shown in FIG. 5, the joint error $\Delta\theta$ occurs between waveforms A and B in the pulse signal of the joint 112. The reason why the joint error $\Delta\theta$ occurs is that the resilient torsion deformation of the wave gearing speed reducer 11 is dominant. If the joint error $\Delta\theta$ fails within the permissible range, the wave gearing speed reducer 11 is in the normal use state.

If a collision occurs as shown in FIG. 6, the resilient torsion deformation of the wave gearing speed reducer 11 causes torsion in the joint 112, and this increases the torsion between the waveforms A and B, i.e., the joint error $\Delta\theta$. If $\Delta\theta$ exceeds the collision determining value $\theta_c$ as shown in FIG. 6, it is detected that a collision has occurred. Note that $\Delta\theta$ is stored in the RAM 203 for a predetermined period, and can be read out at an arbitrary timing.

Figure 7:
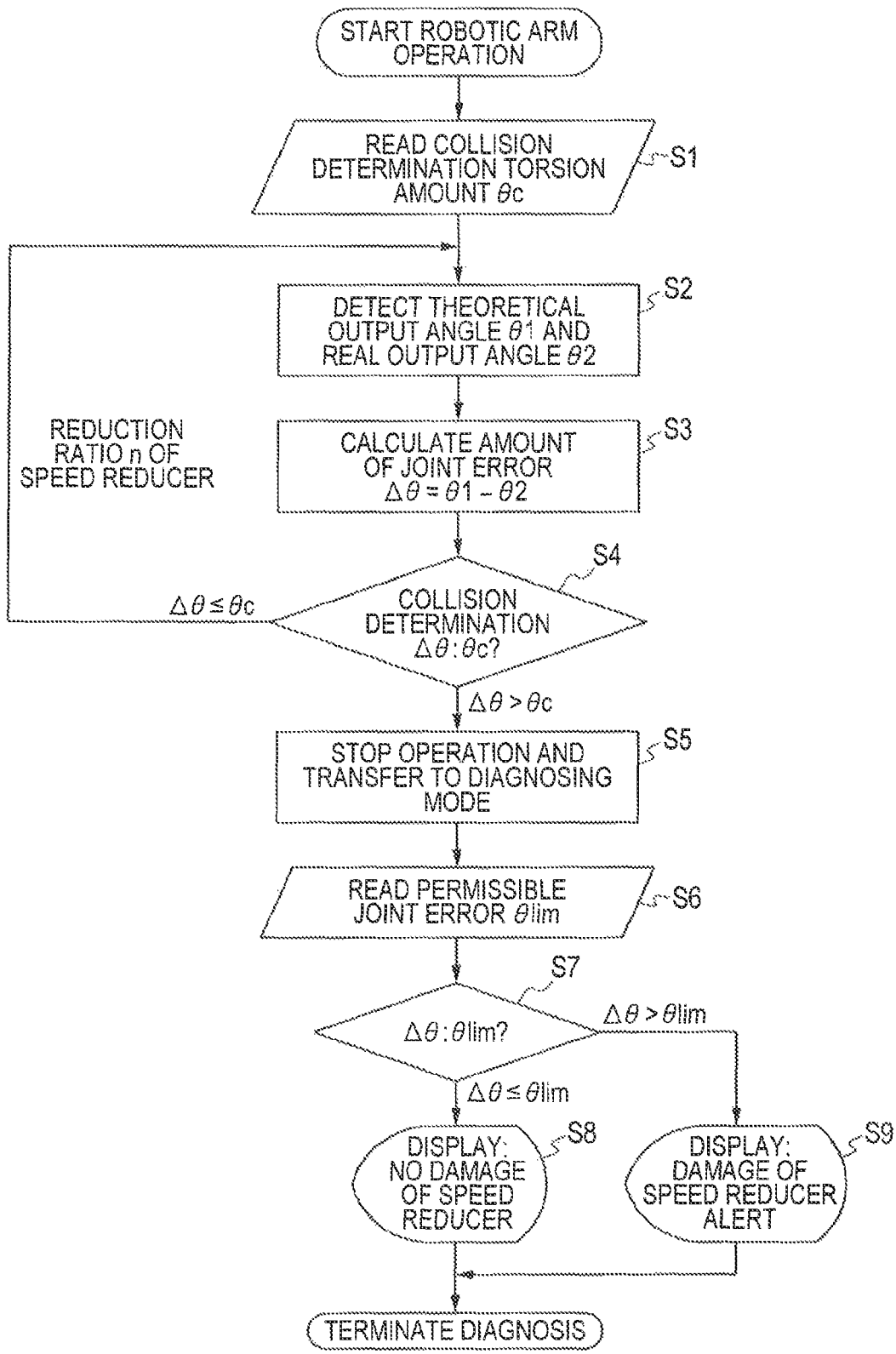
FIG. 7 is a flowchart showing the operation of a speed reducer state diagnosing process when collision occurs.

A speed reducer state diagnosing process (speed reducer state diagnosing method) when the robotic arm 101 collides against a surrounding structure or the like will be explained below with, reference to FIG. 7. FIG. 7 is a flowchart showing the operation of the speed reducer state diagnosing process when a collision occurs. Note that the CPU 201 executes each step shown in FIG. 7 by reading out the speed reducer state diagnosing program stored in the HDD 204.

As shown in FIG. 7, the CPU 201 first reads out the predetermined collision determining value $\theta_c$ from the collision determining threshold value storing portion 404 when the operation of the robotic arm 101 is started (step S1). In this step, the HDD 204 functions as the collision determining threshold value storing portion 404. Then, based on input rotational angle information from the input encoder 10 and output rotational angle information from the output encoder 16, the CPU 201 calculates the theoretical output angle $\theta_1$ and real output angle $\theta_2$ (an input rotational angle acquiring step and output rotational angle acquiring step, step 32).

Subsequently, based on the input/output joint angle calculation results in step S2, the CPU 201 functions as the joint error calculating portion 403 and calculates the input-output joint error $\Delta\theta$, i.e., the torsion amount of the joint 112 as $\Delta\theta=\theta_2-\theta_1$ (step S3). In this step, $\Delta\theta$ is calculated by obtaining a maximum value within a predetermined time range when a collision is detected. Then, the CPU 201 compares the collision determining value $\Delta\theta$ read from the collision determining threshold value storing portion 404 in step S1 with the calculation result of the joint error $\Delta\theta$ calculated in step S3 (step S4). In this step, the HDD 204 functions as the collision determining threshold value storing portion 404, and the CPU 201 functions as the collision determining portion 405. Steps S2 to S4 are repeated as long as no collision is detected. If a collision is detected, the process transfers to step S5.

If determining that there is a collision, the CPU 201 instructs the servo-control device 313 to transfer to a diagnosing mode, and stops the operation of the servo motor 1 (step S5). Then, the CPU 201 reads out the permissible joint error $\theta_{lim}$ of the wave gearing speed reducer 11, which is stored in the permissible joint error storing portion 406 (step S6). In this step, the HDD 204 functions as the permissible joint error storing portion 406.

Subsequently, the joint error comparison determining portion 407 compares the joint error $\Delta\theta$ calculated in step S3 with the permissible joint error $\theta_{lim}$ of the wave gearing speed reducer 11, which is read out in step 36 (step 37). If the generated joint error $\Delta\theta$ is equal to or smaller than the permissible joint error, the joint error comparison determining portion 407 determines that the wave gearing speed reducer 11 is not damaged, and displays "no damage of speed reducer" on the monitor 311 (a speed reducer state acquiring step, step S8). On the other hand, if the generated joint error $\Delta\theta$ is larger than the permissible joint error $\theta_{lim}$, the joint error comparison determining portion 407 determines that the wave gearing speed reducer 11 is damaged, and displays (alerts) "damage of speed reducer" on the monitor 311 (a speed reducer state acquiring step, step S9). In this step, the CPU 201 functions as the joint error comparison determining portion 407. When the notification to the monitor 311 is completed in steps S8 and S9, the CPU 201 terminates the diagnosis.

In the robot apparatus 500 according to the first embodiment as explained above, damage to the wave gearing speed reducer 11 of a joint when the robotic arm 101 collides can be determined without disassembling the robotic arm 101. It is also possible to perform accurate determination by determining the damage level by using the joint error $\Delta\theta$ which occurs when the collision occurs. That is, the state of the wave gearing speed reducer 11 of the robotic arm 101 can accurately be determined within a short time.

Also, when this method is introduced to the joints 111 to 116 of the robotic arm 101, a joint damaged by a collision can be specified even if the damaged joint is difficult to specify or even if a plurality of joints are damaged. When compared to the conventional methods, therefore, it is possible to rapidly diagnose a failure caused by the collision of the robotic arm 101.

Note that the servo motor 1 and wave gearing speed reducer 11 are directly connected in this embodiment, but a timing belt is sometimes formed between a servo motor and wave gearing speed, reducer. In this case, the permissible torsion angle need only be separately obtained by an experiment or the like.

Second Embodiments

Next, a robot apparatus 500A according to the second embodiment of the present invention will be explained with reference to FIGS. 8 and 9. In the first embodiment, a failure of the wave gearing speed reducer is determined by detecting a joint error. In the second embodiment, a means for reducing damage to a wave gearing speed reducer 11 by calculating the rising rate of a joint error and stopping a servo motor by performing collision determination from the rising rate will be described.

Note that the overall arrangement of the robot apparatus 500A is the same as that of the first embodiment, so an explanation thereof will be omitted, and the difference from the first embodiment, i.e., an arrangement for executing a program of stopping the servo motor by performing collision determination from the rising rate will mainly be explained. First, the functions of a CPU 201 and HDD 204 when executing a motor stopping process based on the joint error rising rate according to the second embodiment will be explained with reference to FIG. 8. FIG. 8 is a functional block diagram showing the control system of the robot apparatus 500A according to the second embodiment.

Figure 8:
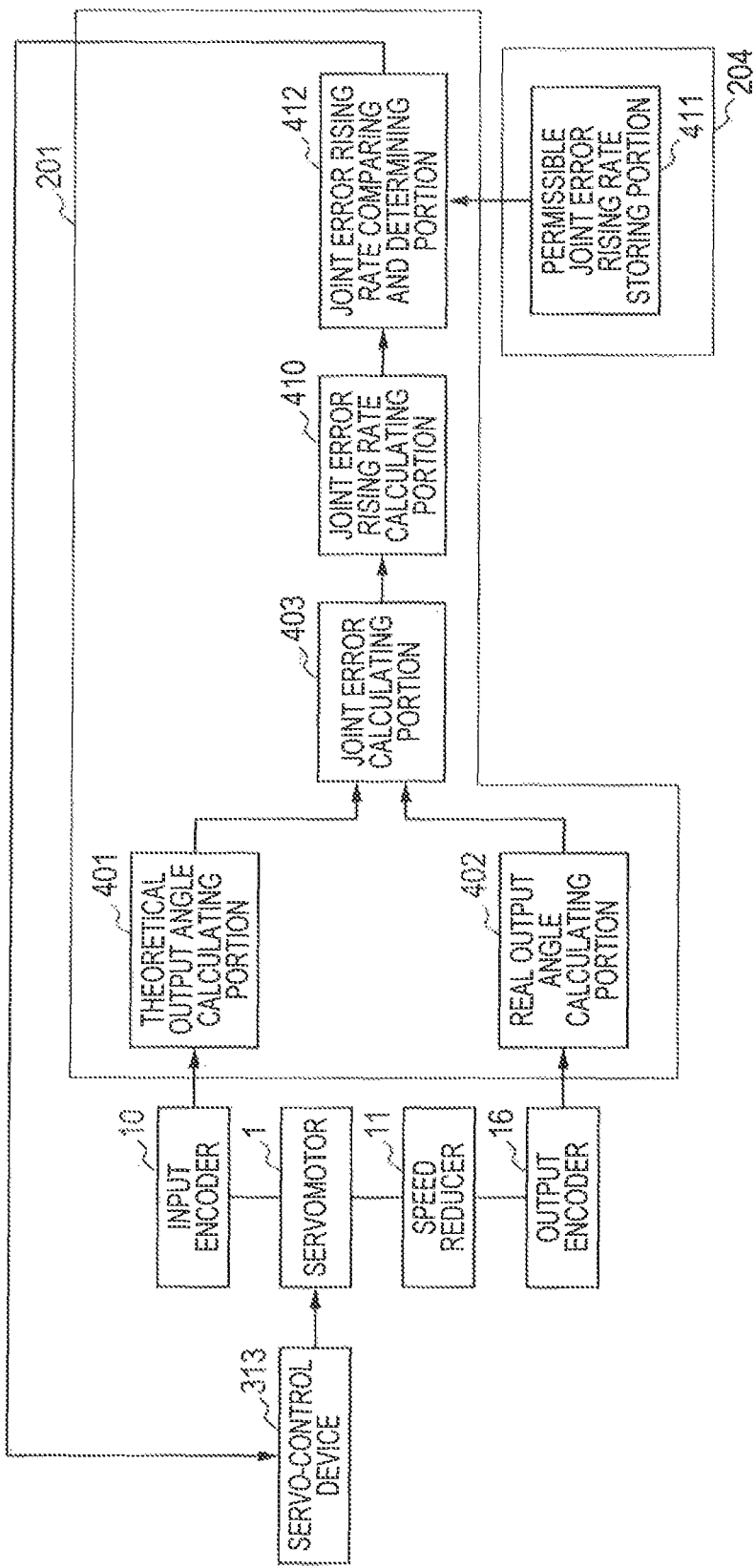
FIG. 8 is a functional block diagram, showing the control system of a robot apparatus according to the second embodiment.

As shown in FIG. 8, the CPU 201 according to the second embodiment further includes a joint error rising rate calculating portion 410 and joint error rising rate comparing and determining portion 412. Also, the HDD 204 according to the second embodiment further includes a permissible joint error rising rate storing portion 411.

The joint error rising rate calculating portion 410 calculates the rising rate, for each predetermined time, of an input-output joint error calculated by a joint error calculating portion 403. The permissible joint error rising rate storing portion 411 stores a permissible value (permissible rising rate) of the joint error rising rate within a predetermined time. The joint error rising rate comparing and determining portion 412 compares the permissible value of the joint error rising rate within the predetermined time, which is prestored in the permissible joint error rising rate storing portion 411, with the joint error rising rate within the predetermined time, which is calculated by the joint error rising rate calculating portion 410. If the rising rate exceeds the permissible value, the joint error rising rate comparing and determining portion 412 issues an instruction for stopping a servo motor 1.

Next, the servo motor stopping process based on the joint error rising rate will be explained with reference to FIG. 9. FIG. 9 is a flowchart showing the servo motor operation stopping process Cased on the joint error rising rate. Note that the CPU 201 executes each step shown in FIG. 9 by reading out a motor stopping program based on the joint, error rising rate, which is contained in a program 330 stored in the HDD 204.

Figure 9:
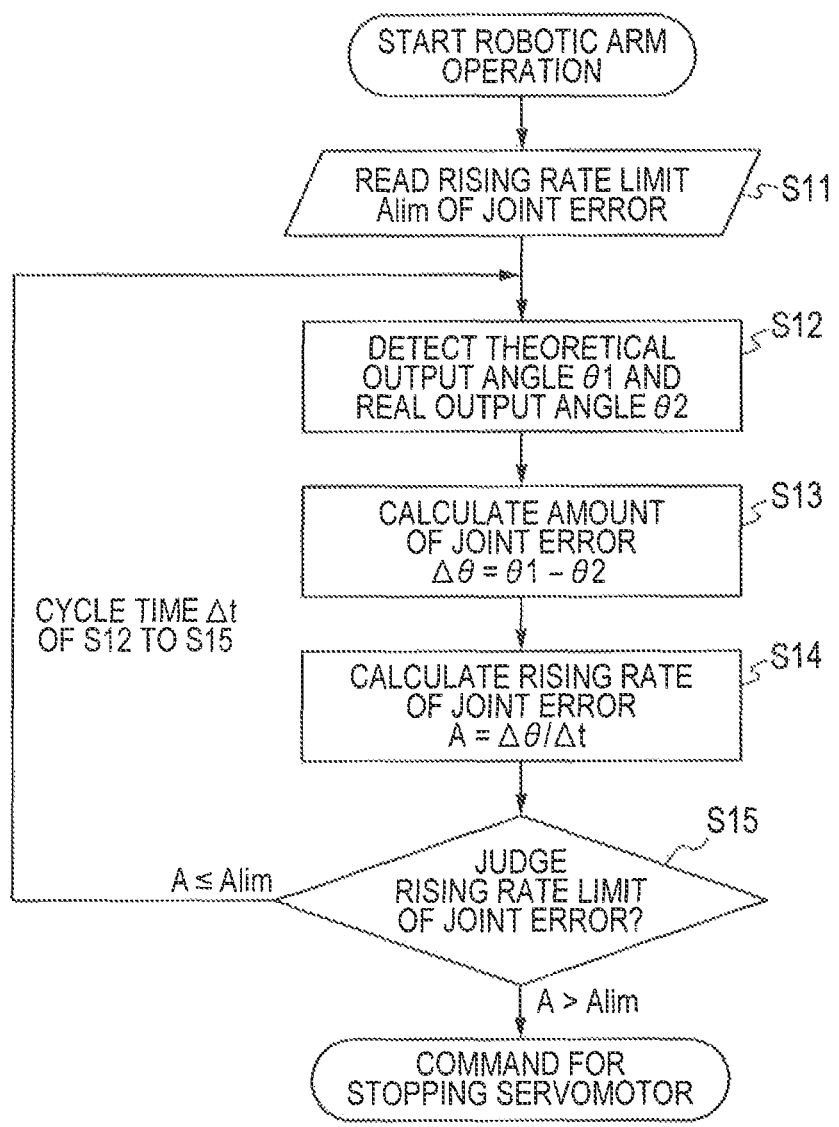
FIG. 9 is a flowchart showing a servo motor operation stopping process based on a joint error rising rate.

As shown in FIG. 9, the CPU 201 reads out a predetermined limit $A_{lim}$ of the joint error rising rate from the permissible joint error rising rate storing portion 411 when the operation of a robotic arm 101 is started (step S11). In this step, the HDD 204 functions as the permissible joint error rising rate storing portion 411. An error rising rate generated in a normal operation may also be used as this permissible value, and the permissible value is time-series data of the error rising rate in a normal operation. It is also possible to further add a margin such as a variation. Steps S12 and S13 are the same as steps S2 and S3 of the first embodiment, so an explanation thereof will be omitted.

Then, the CPU 201 functions as the joint error rising rate calculating portion 410, and calculates a joint error rising rate within a predetermined time (step S14). In this embodiment, this predetermined time is a cycle time Δt of one cycle from step S12 to step S15. However, a separately determined value may also be used.

Subsequently, the CPU 201 functions as the joint error rising rate comparing and determining portion 412, and instructs the servo motor 1 to stop operating if the joint error rising rate A calculated in step S14 exceeds the limit $A_{lim}$ read out in step S11 (a preventing step, step S15). Note that when stopping the servo motor 1, it is desirable to, e.g., display a notification (alert) to the user on a monitor 311, as in the first embodiment.

In the robot apparatus 500A according to the second embodiment as explained above, the stop instruction is sent to the servo motor based on the rising rate of a joint error which occurs due to a collision. When compared to a case in which a joint error is used as a threshold value, therefore, in the initial stage of a small collision of a joint error, the occurrence of a joint error after that can be predicted. This makes it possible to further reduce damage by a collision.

Third Embodiment

A robot apparatus 500B according to the third embodiment of the present invention will now be explained with reference to FIGS. 10 and 11. In the first embodiment, the method of determining damage to the wave gearing speed reducer 11 has been described. When using a wave gearing speed reducer, however, damage caused by ratcheting is crucial. Therefore, a ratcheting detecting process for a wave gearing speed reducer 11 will be described in the third embodiment.

Note that the overall arrangement of the robot apparatus 500B is the same as that of the first embodiment, so an explanation thereof will be omitted, and the difference from the first embodiment, i.e., an arrangement for executing the ratcheting detecting process for the wave gearing speed reducer 11 will mainly be explained. First, the functions of a CPU 201 and HDD 204 when executing the ratcheting detecting process according to the third embodiment will be explained with reference to FIG. 10. FIG. 10 is a functional block diagram showing the control system of the robot apparatus 500B according to the third embodiment.

Figure 10:
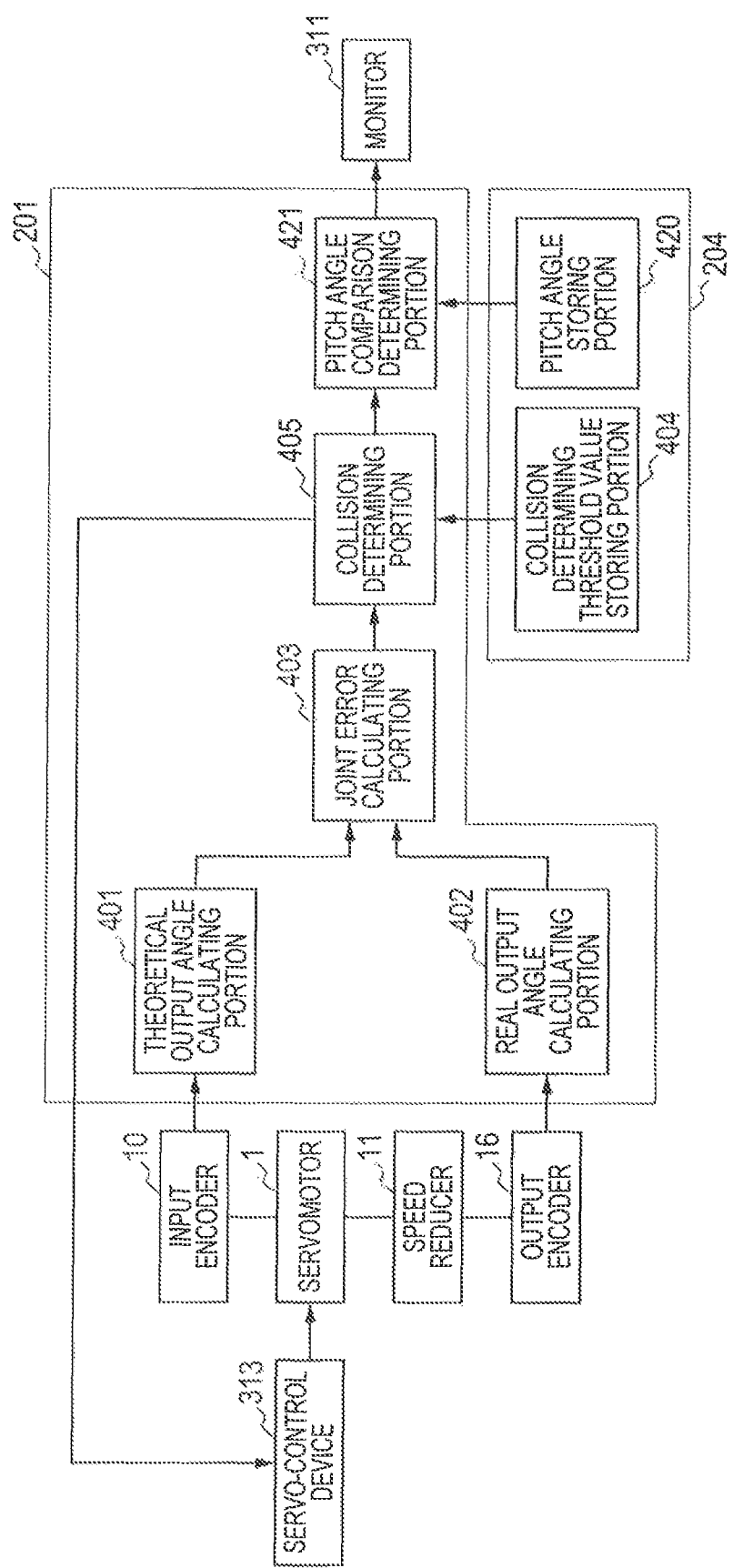
FIG. 10 is a functional block diagram showing the control system of a robot apparatus according to the third embodiment.
Figure 11:
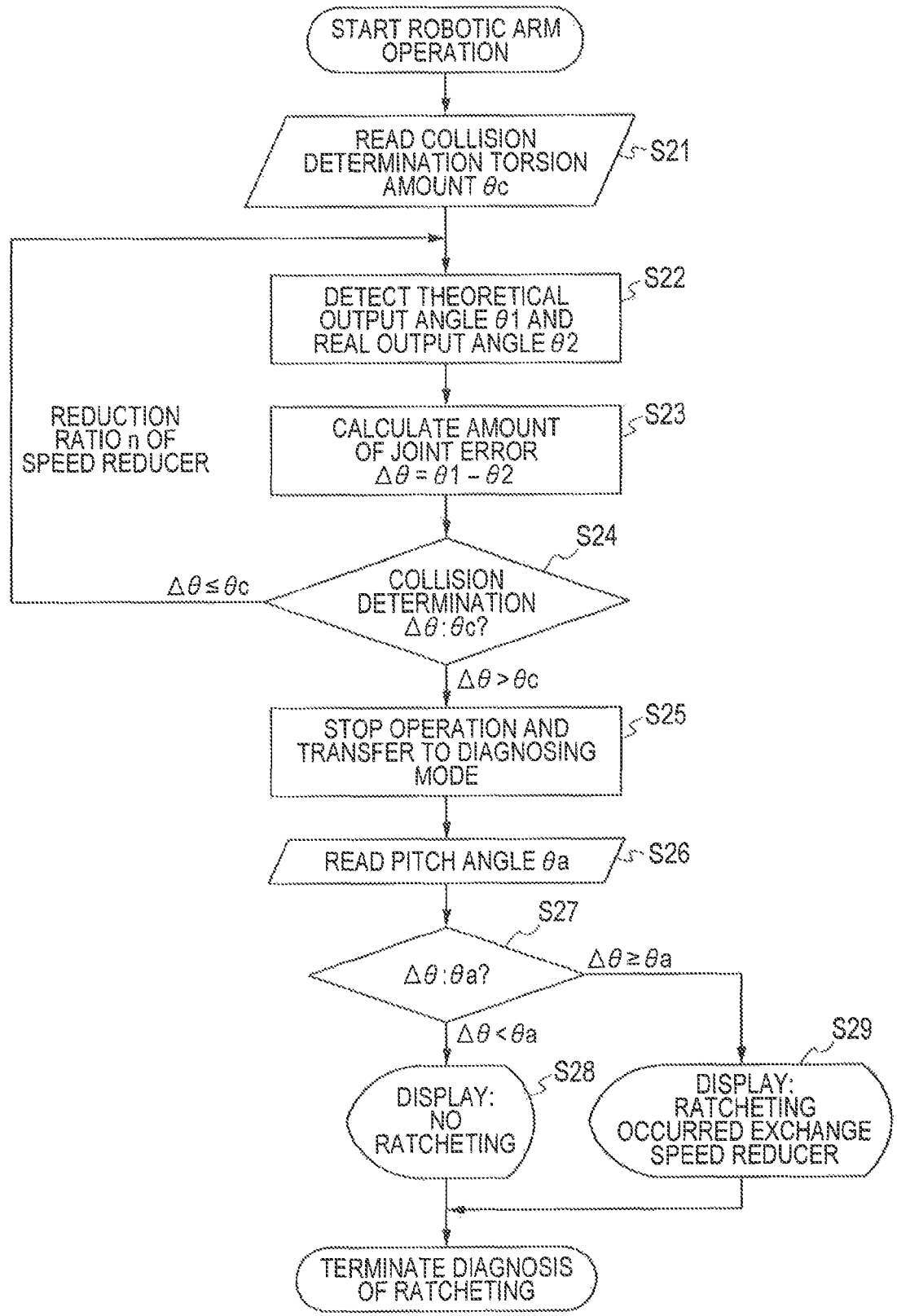
FIG. 11 is a flowchart showing a ratcheting detecting process.

As shown in FIG. 10, the CPU 201 according to the third embodiment further includes a pitch angle comparison determining portion 421. Also, the HDD 204 according to the third embodiment further includes a pitch angle storing portion 420. Note that a pitch angle according to this embodiment indicates an angular interval between adjacent teeth of a speed reducer. For example, the pitch angle of a speed reducer having 100 teeth is 360°+100=3.6°.

The pitch angle storing portion 420 stores a pitch angle $\theta_a$ of the speed reducer. The pitch angle comparison determining portion 421 determines whether the wave gearing speed reducer 11 has caused ratcheting when a collision has occurred. More specifically, if a joint error Δθ calculated by a joint error calculating portion 403 is larger than the pitch angle $\theta_a$ of the wave gearing speed reducer 11, the pitch, angle comparison determining portion 421 determines that ratcheting has occurred.

Next, the ratcheting detecting process for the wave gearing speed reducer 11 according to the third embodiment will be explained with reference to FIG. 11. FIG. 11 is a flowchart showing the ratcheting detecting process. Note that the CPU 201 executes each step shown in FIG. 11 by reading out a ratcheting detecting program contained in a program 330 stored in the HDD 204.

An operation from step S21 to step S25 is the same as that from step S1 to step S5 in the first embodiment, so an explanation thereof will be omitted. When the process transfers to a diagnosing mode in step S25, the CPU 201 reads out the prestored pitch angle $\theta_a$ from the pitch angle storing portion 420 (step S26). In this step, the HDD 204 functions as the pitch angle storing portion 420. Since the pitch angle $\theta_a$ is determined by the number of teeth of the wave gearing speed reducer 11, the pitch angle $\theta_a$ is confirmed by a catalog value or the like in advance, and stored in the pitch angle storing portion 420.

Then, the CPU 201 functions as the pitch angle comparison determining portion 421, and compares the pitch angle $\theta_a$ read out in step 326 with the joint error Δθ calculated in step S23, thereby determining whether the joint error Δθ is larger than the pitch angle $\theta_a$ (step S27). If determining that the joint error AG is equal to or smaller than the pitch angle, the CPU 201 displays "no ratcheting" on a monitor 311 (step S28). On the other hand, if determining that the joint error Δθ is larger than the pitch angle $\theta_a$, the CPU 201 displays the occurrence of ratcheting on the monitor 311, recommends the exchange of the wave gearing speed reducer 11, and terminates the ratcheting detecting program (step S29).

As explained above, the robot apparatus 500B according to the third embodiment can detect ratcheting based on a joint error which occurs due to a collision and the pitch angle of the wave gearing speed reducer 11. Accordingly, it is possible to rapidly determine whether to exchange the wave gearing speed reducer 11 if ratcheting occurs.

Fourth Embodiment

A robot apparatus 500C according to the fourth embodiment of the present invention will be explained below with reference to FIGS. 12 to 14. In the first to third embodiments, damage determination and damage reduction are performed by detecting the difference between the theoretical output angle and real output angle of the wave gearing speed reducer. Generally, the output angle of a speed reducer is obtained by adding an error to an ideal output angle calculated by dividing the input rotational angle by the reduction ratio. In the fourth embodiment, this error is called an angle transfer error. If a speed reducer including a gear such as a wave gearing speed reducer is damaged, the angle transfer error decreases due to the plastic deformation of the gear surface or a change in surface roughness. In the fourth embodiment, therefore, damage determination is performed by using the change in angle transfer error before and after a collision. This will be explained, in detail below.

Note that the overall arrangement of the robot apparatus 500C is the same as that of the first embodiment, so an explanation thereof will be omitted, and the difference from the first embodiment, i.e., an arrangement for executing a speed reducer state diagnosing program based on the angle transfer error of a wave gearing speed reducer 11 will mainly be explained. First, the functions of a CPU 201 and HDD 204 when executing the speed reducer state diagnosing program, based on the angle transfer error according to the fourth embodiment will be explained with reference to FIG. 12. FIG. 12 is a functional block diagram showing the control system of the robot apparatus 500C according to the fourth embodiment.

Figure 12:
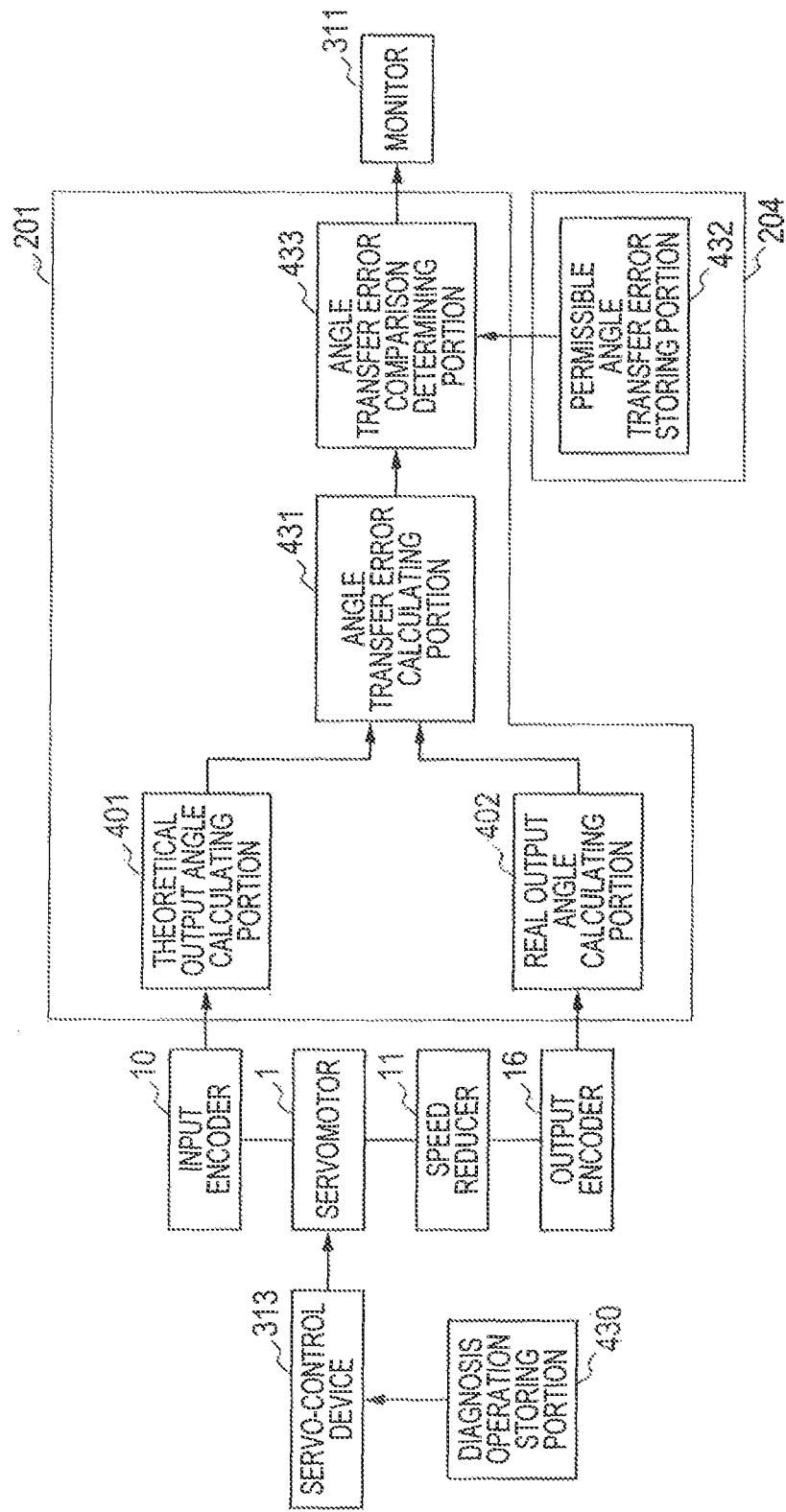
FIG. 12 is a functional block diagram showing the control system of a robot apparatus according to the fourth-embodiment.

As shown in FIG. 12, the CPU 201 according to the fourth embodiment further includes an angle transfer error calculating portion 431 and angle transfer error comparison determining portion 433. Also, the HDD 204 according to the fourth embodiment further includes a diagnosis operation storing portion 430 and permissible angle transfer error storing portion 432.

The diagnosis operation storing portion 430 stores the posture of a robotic arm 101 and the rotational speed of a servo motor 1 when the diagnosis operation of this embodiment is performed. Since the state of a joint such as a load torque changes in accordance with the posture of the robotic arm 101, an angle transfer error also changes, albeit subtly, in accordance with the posture of the robotic arm 101. To compare angle transfer errors before and after a collision, therefore, the postures of the robotic arm 101 must be the same before and after the collision.

As the posture storage of the robotic arm 101 in this embodiment, the joint angle of each of first to sixth joints 111 to 116 need only be stored. Also, the robotic arm 101 includes plurality of joints and a plurality of links, i.e., includes a plurality of inertial loads and a plurality of springs, and this complicates a vibration mode. This vibration mode changes with the posture of the robotic arm 101 as well. When measuring the angle transfer error, the servo motor 1 is rotated and acts as a vibration source. To compare the angle transfer errors before and after a collision, the servo motor must be set at the same rotational speed before and after the collision in order to obtain the same vibration state.

The angle transfer error calculating portion 431 calculates an angle transfer error $\theta_{er}$ when a rotating shaft 2 of the servo motor 1 is rotated in the joint 112 of the robotic arm 101 taking a diagnostic posture. The permissible angle transfer error storing portion 432 stores a permissible value of the angle transfer error $\theta_{er}$. In this embodiment, the angle transfer error in the joint 112 of the robotic arm 101 in a normal period, is stored as a permissible angle transfer error $\theta_{er0}$. However, it is also possible to use a separately determined value.

The angle transfer error comparison determining portion 433 compares the angle transfer error $\theta_{er}$ calculated by the angle transfer error calculating portion 431 with the permissible angle transfer error $\theta_{er0}$ read out from the permissible angle transfer error storing portion 432, thereby determining the deterioration of the wave gearing speed reducer 11.

Figure 13:
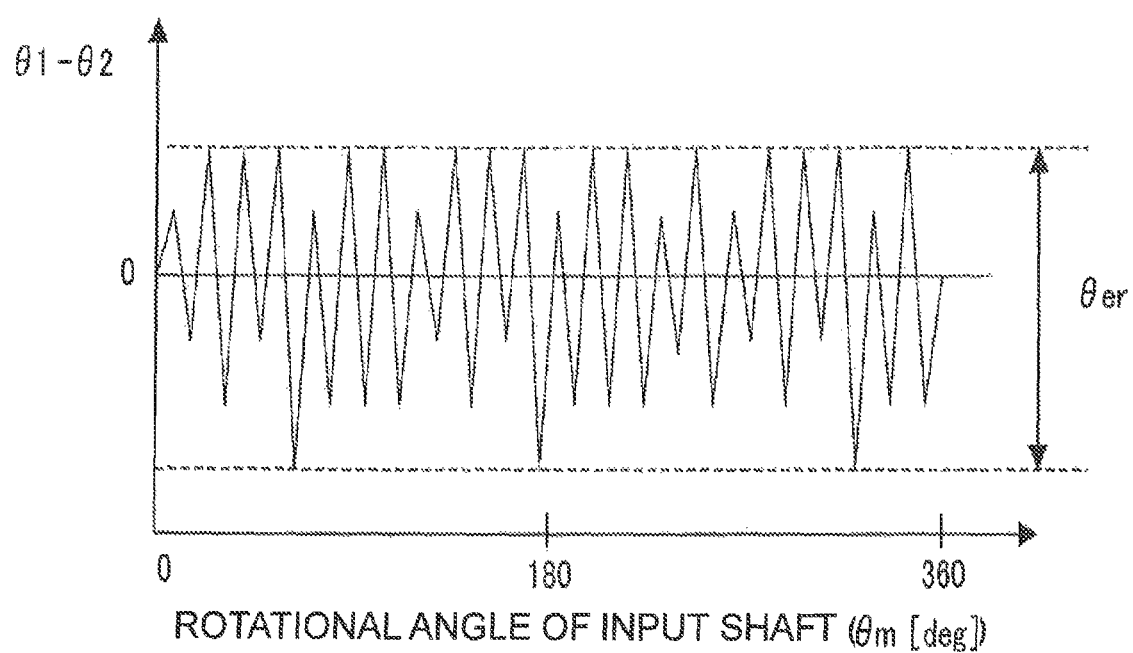
FIG. 13 is a view for explaining an angle transfer error.

FIG. 13 is a view for explaining the angle transfer error. FIG. 13 shows the angle transfer error $\theta_{er}$ when the input side is rotated 360°, by plotting the difference between the theoretical rotational angle and real rotational angle on the output side on the ordinate, and the input rotational angle on the abscissa. The angle transfer error is the difference between the theoretical rotational angle and real rotational angle on the output side calculated from the number of input pulses in a reduction mechanism. This is one main cause of decreasing the accuracy of the robotic arm 101.

Next, the speed reducer state diagnosing process of the robot apparatus 500C according to the fourth embodiment will be explained with reference to FIG. 14. FIG. 14 is a flowchart showing the operation of the speed reducer state diagnosing process. Note that the CPU 201 executes each step shown in FIG. 14 by reading out a speed reducer state diagnosing program contained in a program. 330 stored in the HDD 204.

Figure 14:
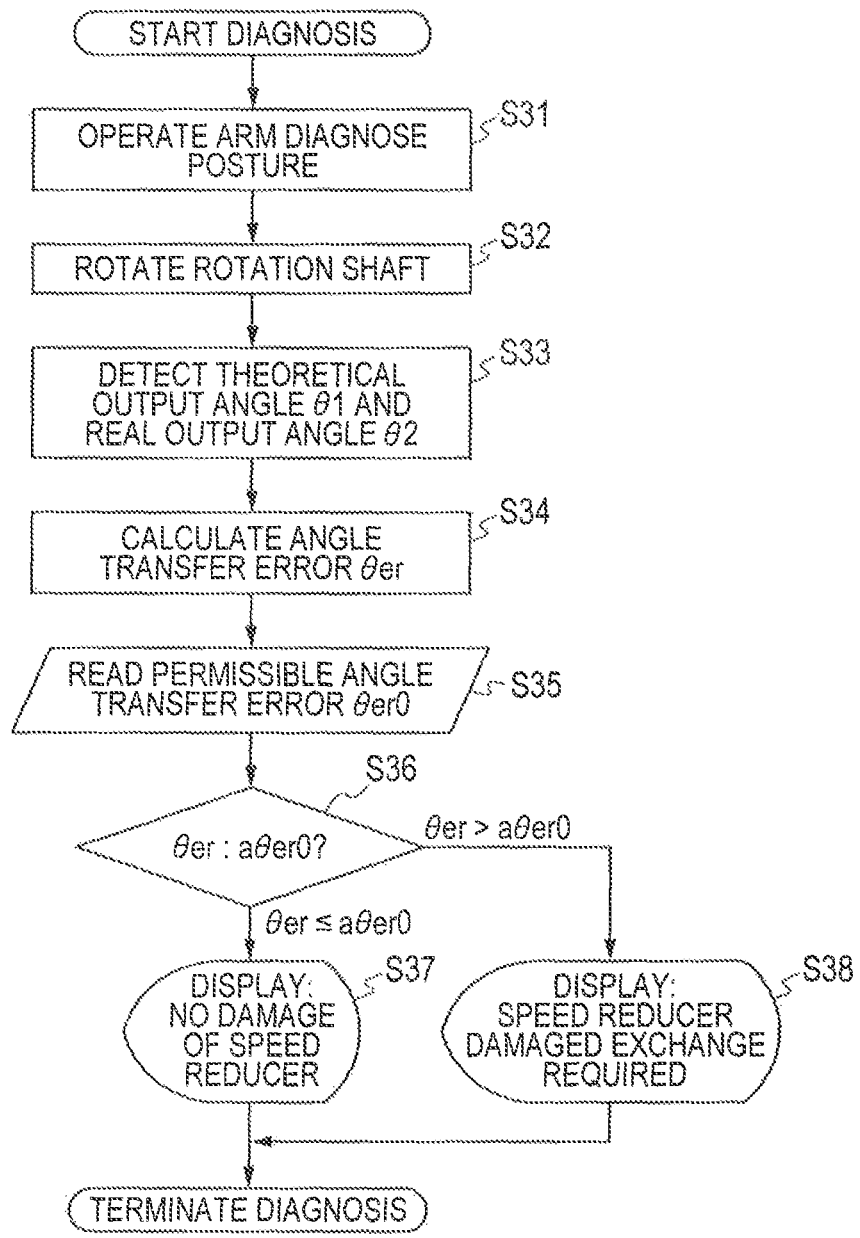
FIG. 14 is a flowchart showing a speed reducer state diagnosing process operation.

As shown in FIG. 14, when diagnosis is started, the robotic arm 101 is operated to a predetermined posture in order to remove the influence of a posture from a joint error. In this step, the servo motor 1 is driven such that the robotic arm 1 takes the posture stored in the diagnosis operation storing portion 430 (step 331). That is, the load on the wave gearing speed reducer 11 changes in accordance with the posture of the robotic arm 101. When comparing the angle transfer errors as in the fourth embodiment, therefore, the angle transfer errors must be detected in the same posture as the reference posture in a normal period. Note that it is possible to use a plurality of reference postures in a normal period.

When the robotic arm 101 is set in a predetermined posture, the rotating shaft 2 is rotated once by a command to the servo motor 1 in order to detect the angle transfer error (step S32). The rotational speed when rotating the rotating shaft 2 once is desirably almost equal to that when performing detection in a normal period, and the rotational speed when performing detection in a normal period is preferably stored in the diagnosis operation storing portion 430. Step S33 is the same as step 32 (the input rotational angle acquiring step and output rotational, angle acquiring step) described earlier, so an explanation thereof will be omitted.

Then the angle transfer error $\theta_{er}$ when the rotating shaft 2 is rotated once in step S32 is obtained (step S34). As shown in FIG. 13, the angle transfer error $\theta_{er}$ is obtained from the difference between the maximum and minimum values of $\theta_1 - \theta_2$. Subsequently, the CPU 201 reads out the prestored permissible angle transfer error $\theta_{er0}$ from the permissible angle transfer error storing portion 432 (step 335). In this step, the HDD 204 functions as the permissible angle transfer error storing portion 432. The permissible angle transfer error $\theta_{er0}$ is preferably measured when the robotic arm 101 is normally operated, and stored in the permissible angle transfer error storing portion 432.

Then, the angle transfer error comparison determining portion 433 compares the angle transfer error $\theta_{er}$ calculated, in step 334 with a value obtained by multiplying the permissible angle transfer error $\theta_{er0}$ read out in step 335 by a coefficient a (step S36). Note that the coefficient a is preferably determined in accordance with the required accuracy of the robotic arm 101. That is, when the robotic arm 101 is required to perform, a precise operation, the coefficient a is set low to make it possible to detect a slight increase in error.

If the measured angle transfer error $\theta_{er}$ is equal to or smaller than the permissible angle transfer error multiplied by the coefficient a, "no damage of speed reducer" is displayed on a monitor 311 (a speed reducer state acquiring step, step S37). On the other hand, if the generated joint error $\Delta\theta$ is larger than the permissible joint error $\theta_{lim}$, is determined that the wave gearing speed reducer 11 requires exchange, and "speed reducer damaged (exchange required)" is displayed on the monitor 311 (alerted) (a speed, reducer state acquiring step, step 338). In this step, the CPU 201 functions as the angle transfer error comparison determining portion 433. When the notification to the monitor 311 is completed in steps S37 and S38, the diagnosis is terminated.

In the robot apparatus 500C according to the fourth embodiment as explained above, the state of the wave gearing speed reducer can be determined by comparing the input-output joint error with that in a normal period. This makes it possible to rapidly determine the exchange of the wave gearing speed reducer. Note that the above-described speed reducer state diagnosing method based on the angle transfer error of the wave gearing speed reducer 11 can also be used at a timing other than that immediately after a collision. For example, the method can be used to check the degree of damage to the wave gearing speed reducer 11 in, e.g., start-up inspection or periodic inspection.

The embodiments of the present invention have been explained above, but the present invention is not limited to the above embodiments. Also, the effects described in the embodiments of the present invention are merely examples of the most preferred effects deriving from the present invention, so the effects of the present invention are not limited to those described in the embodiments of the present invention.

For example, the multi-joint robot 100 is a vertical multi-joint robot of the embodiments. However, the multi-joint robot 100 may also be a horizontal multi-joint robot (scalar robot) or parallel-link robot.

Also, each processing of the embodiments is practically executed by the CPU 201 as a control unit of the controller 200. Therefore, the above-described functions may also be achieved by supplying a recording medium recording a program for implementing the functions to the controller 200, and reading out and executing the program stored in the recording medium by a computer (CPU or MPU) of the controller 200. In this case, the program itself read, out from the recording medium implements the functions of the above-described embodiments, and the program itself and the recording medium recording the program constitute the present invention.

Furthermore, in the embodiments, a case in which a computer-readable recording medium is the HDD 204 and the program 330 is stored in the HDD 204 has been explained. However, the present, invention is not limited to this. The program 330 can be recorded, on any recording medium as long as the medium is a computer-readable recording medium. For example, the ROM 202, external memory device 312, or recording disk 331 shown in FIG. 3 can be used as the recording medium for supplying the program. Practical examples usable as the recording medium are a flexible disk, hard disk, optical disk, magnetooptical disk, CD-ROM, CD-R, magnetic tape, nonvolatile memory card, and ROM. The program of the embodiments may also be downloaded across a network and executed by a computer.

The present invention is not limited to the case in which the functions of the embodiments are implemented by executing the readout program code by the computer. The present invention includes a case in which an OS (Operating System) or the like running on the computer performs a part or the whole of actual processing based on instructions of the program code, thereby implementing the functions of the above-described embodiments.

Furthermore, the program code read out from the recording medium may also be written in a memory of a function expansion card inserted into the computer or of a function expansion unit connected to the computer. The present invention includes a case in which a CPU or the like of the function expansion card or function expansion unit performs part or the whole of actual processing based on instructions of the program code, thereby implementing the functional of the embodiments.

The present invention can provide a robot apparatus and speed reducer state diagnosing method capable of accurately determining the state of a speed reducer of a multi-joint robot within a short time.

While the present invention has been described with reference to exemplary embodiments, it is to be understood that the invention is not limited to the disclosed exemplary embodiments. The scope of the following claims is to be accorded the broadest interpretation so as to encompass ail such modifications and equivalent structures and functions.

This application claims the benefit of Japanese Patent Application No. 2013-129400, filed Jun. 20, 2013, which is hereby incorporated, by reference herein in its entirety.

What is claimed is:

1. A robot apparatus comprising:
a multi joint robot comprising:
a joint including a motor;
a speed reducer connected to the motor;
input angle detecting means configured to detect an input rotational angle of a rotating shaft of the motor;
output angle detecting means configured to detect an output rotational angle of the speed reducer; and
a controller configured to compare a joint error calculated from an angle difference between the input rotational angle detected by the input angle detecting means and the output rotational angle detected by the output angle detecting means with a preset permissible joint error of the speed reducer, and determine that the speed reducer is damaged when the joint error is greater than the permissible joint error, and determine that the speed reducer is normal when the joint error is not greater than the permissible joint error.

2. An apparatus according to claim 1, wherein the controller further comprises:
a storing portion configured to store the permissible joint error of the speed reducer; and
a calculating portion configured to determine that the speed reducer is in a normal use disabled state if the calculated joint error is larger than the permissible joint error, and determine that the speed reducer is in a normal use enabled state if the calculated joint error is not more than the permissible joint error.

3. The apparatus according to claim 1, wherein the controller further comprises:
a storing portion configured to store a permissible rate of increase in joint error acting on the speed reducer; and a calculating portion configured to calculate a rate of increase in joint error acting on the speed reducer from the angle difference when the multi-joint robot collides, and stop the motor if the calculated rate of increase is larger than the permissible rate of increase stored in the storing portion.

4. The apparatus according to claim 1, wherein the joint error is calculated as an angle transfer error between the input rotational angle detected by the input angle detecting means and the output rotational angle detected by the output angle detecting means in a predetermined posture.

5. A speed reducer state diagnosing method configured to diagnose a state of a speed reducer of a multi joint robot comprising a joint including a motor, the speed reducer connected to the motor, input angle detecting means configured to detect an input rotational angle of a rotating shaft of the motor, and output angle detecting means configured to detect an output rotational angle of the speed reducer, the method comprising:

an input rotational angle acquiring step of acquiring the input rotational angle detected by the input angle detecting means;

an output rotational angle acquiring step of acquiring the output rotational angle detected by the output angle detecting means; and a speed reducer state diagnosing step of comparing a joint error calculated from an angle difference between the input rotational angle acquired in the input rotational angle acquiring step and the output rotational angle acquired in the output rotational angle acquiring step with a preset permissible joint error of the speed reducer, and determining that the speed reducer is damaged when the joint error is greater than the permissible joint error, and determining that the speed reducer is normal when the joint error is not greater than the permissible joint error.

6. The method according to claim 5, wherein in the speed reducer state diagnosing step, the speed reducer is determined to be in a normal use disabled state if the calculated joint error is larger than the permissible joint error, and the speed reducer is determined to be in a normal use enabled state if the calculated joint error is not more than the permissible joint error.

7. The method according to claim 5, further comprising a preventing step of calculating a rate of increase in joint error acting on the speed reducer from the angle difference when the multi joint robot collides, and stopping the motor if the calculated rate of increase in joint error is larger than a permissible rate of increase in joint error acting on the speed reducer.

8. The method according to claim 5, wherein in the speed reducer state diagnosing step, an angle transfer error between the input rotational angle detected by the input angle detecting means and the output rotational angle detected by the output angle detecting means in a predetermined posture is calculated, and the state of the speed reducer is diagnosed from the calculated angle transfer error.

9. The method according to claim 8, wherein in the speed reducer state diagnosing step, the speed reducer is determined to be in a normal use disabled state if the calculated angle transfer error is larger than a permissible angle transfer error of the speed reducer, and the speed reducer is determined to be in a normal use enabled state if the calculated angle transfer error is not more than the permissible angle transfer error.

10. A non-transitory computer-readable recording medium recording a multi joint robot speed reducer state diagnosing program for a speed reducer of a multi joint robot comprising a joint including a motor, the speed reducer connected to the motor, input angle detecting means configured to detect an input rotational angle of a rotating shaft of the motor, and output angle detecting means configured to detect an output rotational angle of the speed reducer, the program causing a computer to execute the following steps:

an input rotational angle acquiring step of acquiring the input rotational angle detected by the input angle detecting means;

an output rotational angle acquiring step of acquiring the output rotational angle detected by the output angle detecting means; and a speed reducer state diagnosing step of comparing a joint error calculated from an angle difference between the input rotational angle acquired in the input rotational angle acquiring step and the output rotational angle acquired in the output rotational angle acquiring step with a preset permissible joint error of the speed reducer, and determining that the speed reducer is damaged when the joint error is greater than the permissible joint error, and determining that the speed reducer is normal when the joint error is not greater than the permissible joint error.

* * * * *